US006259924B1

(12) United States Patent
Alexander, Jr. et al.

(10) Patent No.: US 6,259,924 B1
(45) Date of Patent: Jul. 10, 2001

(54) METHOD AND SYSTEM FOR COMPARING MEASURED RADIO FREQUENCY SIGNAL PROPAGATION CHARACTERISTICS IN A WIRELESS COMMUNICATION SYSTEM

(75) Inventors: William Francis Alexander, Jr., Halton City; Srikanth Gummadi, Fort Worth, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/475,095

(22) Filed: Dec. 30, 1999

(51) Int. Cl.[7] ............................. H04Q 7/20; H04B 17/00; G01S 3/02
(52) U.S. Cl. ........................ 455/456; 455/457; 455/67.6; 342/457
(58) Field of Search ................................... 455/67.3, 67.6, 455/67.1, 456, 423–425, 501, 504–506, 52.2, 63, 127, 206.1, 226.3, 295, 296, 457, 422; 342/457, 453; 702/71

(56) References Cited

PUBLICATIONS

Alle–Jan van der Veen, Michaela C. Vanderveen, and Arogyaswami Paulraj; "Joint Angle and Delay Estimation Using Shift–Invariance Techniques"; Feb. 2, 1998; IEEE Transactions on Signal Processing, vol. 46; pp. 405–418.

Jeffrey H. Reed, Kevin J. Krizman, Brian D. Woerner, and Theodore S. Rappaport; "An Overview of the Challenges and Progress in Meeting the E–911 Requirement for Location Service"; Apr. 1998; IEEE Communications Magazine; pp. 30–37.

Simon Haykin; "Advances in Spectrum Analysis and Array Processing"; vol. III; pp. 5–23.

D. Douglas Graham; "Wireless Locating—Lost and Found"; From Communications News, Oct. 1998.

"U.S. Wireless Corporation Successfully Completes Pilot Rollout of Radio Camera [tm]Wireless Caller–Location system in Baltimore"; US Wireless.

Michaela C. Vanderveen; "Estimation of Parametric Channel Models in Wireless Communication Networks"; Dec. 1997; pp. 1–149.

*Primary Examiner*—Tracy Legree
(74) *Attorney, Agent, or Firm*—L. Bruce Terry (57) ABSTRACT

In a receiver in a wireless communication system, a plurality of radio frequency signal propagation characteristics associated with a signal transmitted from a transmitter in a coverage area are periodically measured. Next, the plurality of periodically measured radio frequency signal propagation characteristics are processed to produce a time averaged radio frequency signature, wherein the processing extracts the dominant features of the radio frequency signal propagation characteristics. Then the time averaged radio frequency signature is compared with a spatially averaged radio frequency signature, and a figure of merit is generated in response to the comparison. The processing may include decomposing a structured matrix containing vector representations of the plurality of periodically measured radio frequency signal propagation characteristics to extract a subspace that represents the dominant features of the radio frequency signal propagation characteristics of a signal transmitted from a transmitter in a coverage area of the wireless communication system.

16 Claims, 8 Drawing Sheets

METHOD AND SYSTEM FOR COMPARING MEASURED RADIO FREQUENCY SIGNAL PROPAGATION CHARACTERISTICS IN A WIRELESS COMMUNICATION SYSTEM

RELATED APPLICATIONS

This application is related to application Ser. No. 09/475,091 entitled "METHOD AND SYSTEM FOR CREATING A RADIO FREQUENCY SIGNATURE FOR A SIGNATURE REGION IN A COVERAGE AREA OF A WIRELESS COMMUNICATION SYSTEM," which is filed on even date herewith, and which is incorporated herein by reference.

FIELD OF THE INVENTION

The present invention is related in general to wireless communication systems, and more particularly to an improved method and system for comparing measured radio frequency signal propagation characteristics in a wireless communication system.

BACKGROUND OF THE INVENTION

For both users and operators of wireless communications systems it is often desirable to locate subscriber units that are making calls, or are otherwise transmitting or receiving data. Applications for technology that can locate subscribers include locating subscribers requesting 911-emergency services, assisting law enforcement agencies in various law enforcement activities, providing users with local area maps or directions, and providing users with advertising information related to the user's location.

Several technologies have been either used or proposed for providing the subscriber unit's location in a communication system, and each of these technologies has disadvantages. For example, a time difference of arrival (TDOA) system uses measurements from a plurality of base transceivers at known locations. This type of system requires signal reception of the subscriber unit's signal at more than one base transceiver, time synchronization between the base transceivers, and the measurement of line-of-sight wave front propagation, without confusing the line-of-sight signals with multipath signals, which are signals bounced and diffracted from objects affecting the propagation of the signal. The accuracy of synchronization of base transceivers in a cellular system based on interim specification 95 (IS-95), a code division multiple access (CDMA) standard, is not accurate enough to make signal propagation measurements that will provide location estimates with the desired resolution. Additionally, in a dense downtown area, also known as the urban canyon, detection of the line-of-sight wave front may not be possible because line-of-sight signal components may be shadowed or obscured by close-in multipath components.

More advanced TDOA systems use smart antennas to help eliminate some of the multipath components, enhancing detection of the prompt wave front. Smart antennas may also be able to add angle-of-arrival (AOA) measurements to the geometric equations for location finding, which further enhances performance. Unfortunately, the multipath environment of some urban canyons is too confused for smart antennas to be an effective solution. Smart antenna overlap solutions also require adding special phased array antennas to work in conjunction with the existing antennas. Service providers will most likely be reluctant to invest in additional antennas until smart antennas are needed for capacity requirements as well as location finding requirements.

Some engineers and operators propose using the global positioning system satellite system for determining a subscriber's location. This technology also has a problem in the urban canyon. In many places it is not possible to receive line-of-sight signals from a number of satellites that is needed to produce an accurate location estimate.

Other proposals include placing many microcells in an urban core area so that the subscriber's location is estimated by identifying what cell site the subscriber is using. Although microcells are gaining popularity in certain areas, the market has generally rejected microcells for capacity coverage, which means that the number of microcells deployed is probably not extensive enough to support location finding. Most current communication deployment plans still specify macrocellular coverage.

Therefore, it should be apparent that there remains a need for an improved, cost-efficient approach for locating subscriber units in a cluttered area of a communications system service area, where radio frequency signal characteristics of indirect or non-line-of-sight propagation signals are beneficially used to locate a subscriber unit. Accordingly, there is also a need for an improved method and system for comparing measured radio frequency signal propagation characteristics in a wireless communication system, wherein the radio frequency signature is responsive to the dominant features of radio frequency propagation characteristics of a signal transmitted from a selected signature region.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
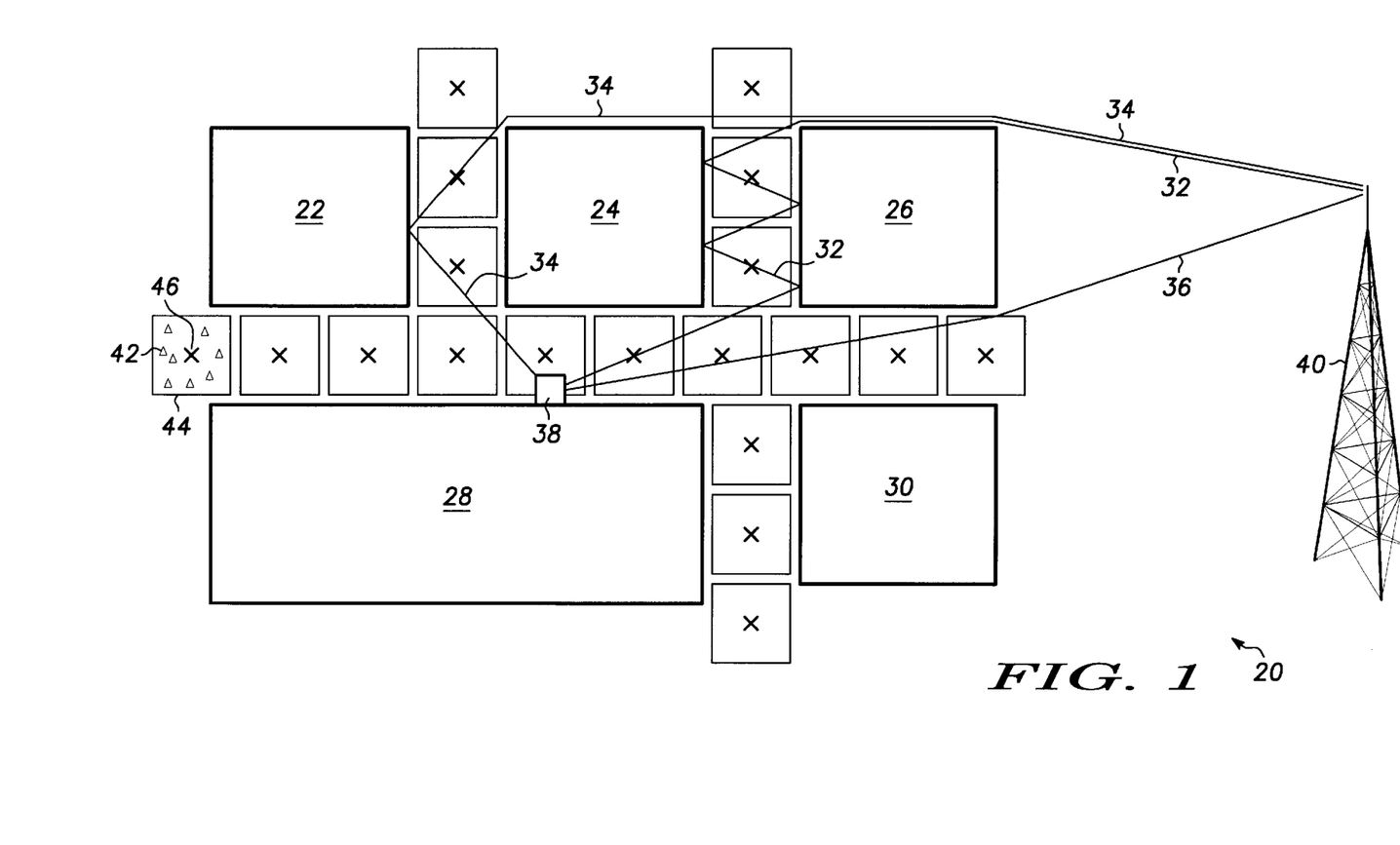
FIG. 1 illustrates multipath signal propagation in an urban canyon area of a wireless communication system coverage area.

With reference now to FIG. 1, there is depicted communications system coverage area 20, which includes buildings 22–30 that reflect and diffract radio frequency signals that travel propagation paths 32–36 between subscriber unit 38 and base transceiver 40.

It should be evident from FIG. 1 that propagation paths 32–34 have different times of flight and angles of arrival than propagation path 36. Thus, if transceiver 40 measures the angle of arrival and timing information from propagating signals and uses that data to estimate the location of subscriber unit 38, the data from propagation paths 32–36 will not coalesce to indicate a single location in communication system coverage area 20 unless signal reflections and diffractions caused by buildings 22–30 are taken into account.

Figure 2:
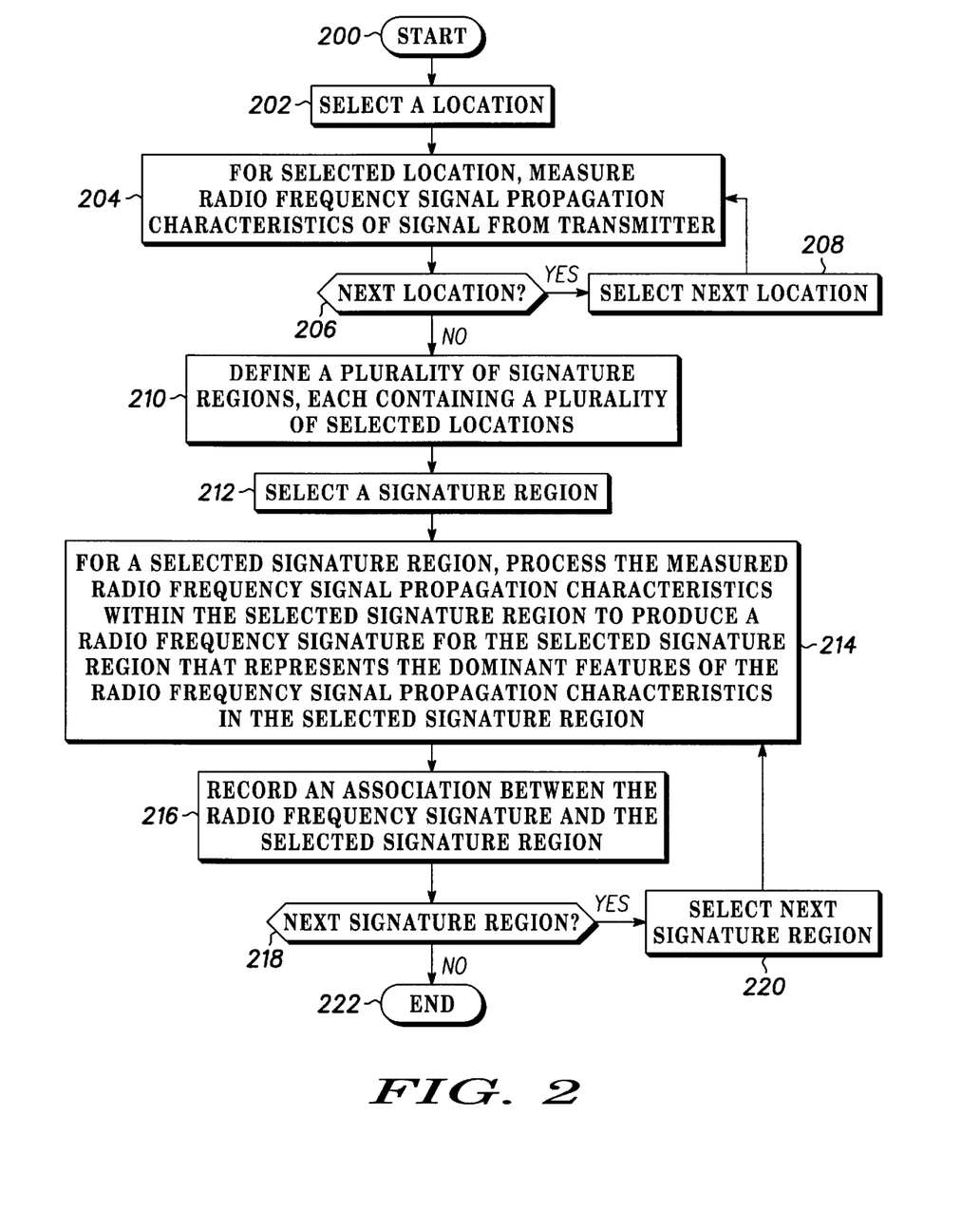
FIG. 2 is a high-level logic flowchart that illustrates the method and operation of creating a spatially averaged radio frequency signatures for signature regions in a coverage area of a wireless communication system in accordance with the method and system of the present invention.

With reference now to FIG. 2, there is depicted a high-level logic flowchart that illustrates the method and operation of creating spatially averaged radio frequency signatures for signature regions in a coverage area in a wireless communication system in accordance with the present invention. As illustrated, the process begins at block 200, and thereafter passes to block 202 wherein the process selects a location in communication system coverage area 20 (See FIG. 1). In a preferred embodiment, this process of selecting a location includes noting the present location of a transmitter in communication system coverage area 20. This may be accomplished by recording a location from a GPS receiver located with the transmitter, or noting the location using maps or surveying equipment. Other electronic location finding devices may also be used, such as the LORAN location finding system, operated by the United States Coast Guard. In a preferred embodiment, the selected location is one of a plurality of locations selected while driving or walking through communication system coverage area 20 while carrying a transmitter that emits a signal. Some selected locations are shown in FIG. 1 at the symbol indicated by reference numeral 42.

After a location is selected, the process measures radio frequency signal propagation characteristics of the signal from the transmitter at the selected location, as indicated at block 204. The measured radio frequency signal propagation characteristics may include the number of multipath components, the average power in each multipath component, the gain and phase of the antenna due to the azimuth and/or elevation angles of arrival and/or polarization of each component, the Doppler frequency of each component, and the relative time delay of each component. These characteristics may be measured explicitly by parametric decomposition of the received signal. However, in a preferred embodiment, the radio frequency signal propagation characteristics are measured implicitly by sampling, computing and recording the channel impulse responses of the particular channel between subscriber 38 and each of the one or more antennas at base transceiver 40.

If the radio frequency signal propagation characteristics are measured explicitly, a parametric model of the channel impulse response is formed, as represented by the following equation:

$$h_e(t) = \sum_{q=1}^{Q(t)} \alpha_q(t) \Gamma_e(\theta_q(t), \varphi_q(t), \xi_q(t)) \delta(t - \tau_q(t)) \quad \text{equation 1}$$

where:
 e is an index to the antenna of interest,
 Q(t) represents the number of paths,
 $\alpha_q(t)$ is the complex amplitude of path q,
 $\Gamma_e(\theta, \phi, \xi)$ is the complex valued response of antenna e due to stimulus by a wavefront with azimuth angle $\theta$, elevation angle $\phi$, and polarization angle $\xi$, and
 $\tau_q(t)$ is the time delay of path q.

This equation for the nonstationary impulse response can be further decomposed by exploiting relative stationarity of certain parts:

$$h(T, \tau) = \sum_{q=1}^{Q(T)} \alpha_q(T) \Gamma_e(\theta_q(T), \varphi_q(T), \xi_q(T)) \delta(\tau - \tau_q(T)) \quad \text{equation 2}$$

In equation 2, T represents time and $\tau$ represents time delay. These parameters are sufficient to characterize the location dependent multipath distortion observed by the transmitted signal. At any given time, the transmitter will occupy a location, e.g. (x(t),y(t)), for which the parameters of the measured impulse response are the radio frequency signal propagation characteristics. (Note that this description of the parametric model excludes modeling of the Doppler frequency shifts due to speed of travel through the environment. This data is implicitly contained within $\alpha_q(T)$. Doppler shifts are due to travel speed, which is only secondarily associated with position. The other parameters described are more directly correlated with the transmitter's location. However, the addition of Doppler could, in some circumstances, prove beneficial.)

Implicit measurements of these characteristics are made by recording samples of the impulse responses without reduction to the fundamental parameters. For example, a vector-valued implicit measurement, $h_e(T)$, of these radio frequency signal characteristics can be represented as follows:

$$h_e(T) = [h_e(T,0) h_e(T,T_s) \ldots h_e(T,(N-1)T_s)]^T \quad \text{equation 3}$$

Note that any linear transformation of the responses (e.g. Fourier transformation) yields an equally valid basis for implicit description of the radio frequency signal propagation characteristics. Certain transformations will create opportunities to limit the data to a smaller region of support, thereby discarding unimportant data and reducing the amount of data to be recorded. For example, a Fourier transformation followed by band-limiting to the frequency bins in which there is significant signal power may reduce the amount of data recorded. These transformations follow the methods of van der Veen, Vanderveen and Paulraj, "Joint Angle and Delay Estimation Using Shift-Invariance Techniques," IEEE Transactions on Signal Processing, February 1998.

Figure 3:
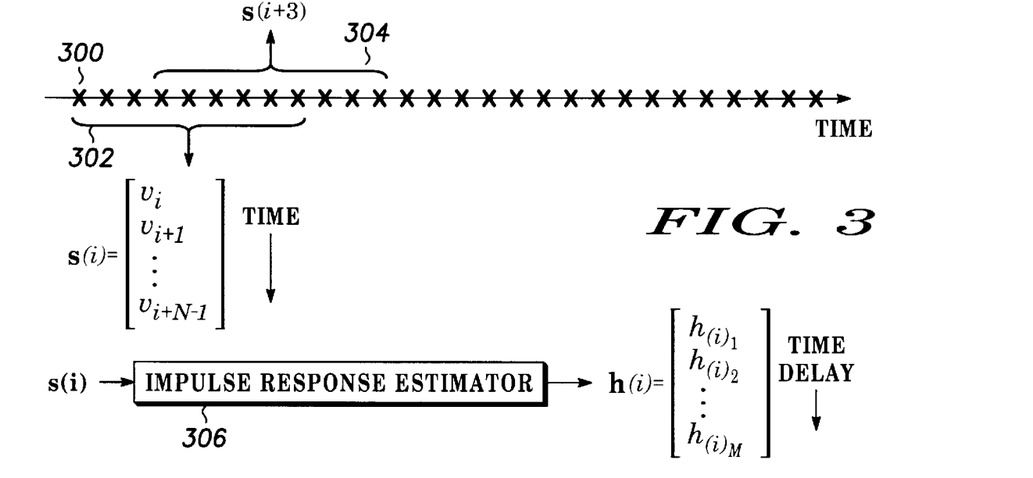
FIG. 3 depicts the processing of raw measurement data to produce an implicit measurement of radio frequency propagation characteristics in the form of a channel impulse response measurement, which measurement is used to produce database record representing a radio frequency signature in accordance with the method and system of the present invention.

In a preferred embodiment, RF signal propagation characteristics are measured implicitly by sampling voltage measurements from one or more antennas at base transceiver 40. With reference now to FIG. 3, a single voltage sample is shown at reference numeral 300. Voltage samples 300 must be taken at a rate greater than the bandwidth of the signal being measured.

To calculate impulse response vector h(i), groups of voltage samples s(i), such as sample groups 302 and 304 having elements $v_i$–$v_{i+N-1}$, are input into impulse response estimator 306. Impulse response estimator 306 delivers samples of the estimated channel impulse response, as in equation 3, and h(i) in FIG. 3. The channel impulse response may be estimated according to the method described in "Joint Angle and Delay Estimation Using Shift-Invariance Techniques," IEEE Transactions on Signal Processing, February 1998.

In a preferred embodiment, when multiple antennas are used, an impulse response is measured for each antenna, wherein the impulse response for antenna e is denoted by $h_e(i)$. For example, if E number of antennas are used, the impulse responses for all antennas for each measurement may be arranged in matrix H(i) as shown in equation 4.

$$H(i)=[h_1(i) h_2(i) \ldots h_E(i)] \quad \text{equation 4}$$

After the radio frequency signal propagation characteristics are measured, the process determines whether or not there is a next location to measure in the communication system coverage area, as depicted at decision block 206. If there is another location to measure, the process passes to block 208, wherein the next location is selected. After selecting the next location, new measurements are taken, as described above with reference to block 204. Note that the selected locations need not be unique, which might be the case if one drives or walks through an intersection in the coverage area twice. Even though more than one impulse response vector may be stored for the same selected location, several different locations should be selected within a signature region.

If, as determined at block 206, all locations have been measured, the process then defines a plurality of signature regions, wherein each signature region contains a plurality of selected locations, as illustrated at block 210. In a preferred embodiment, the selected signature regions are adjacent to each other, and are geometrically similar in shape and size, so that the regions look like a grid of tiles laid over the communications system coverage area. As an example, signature region 44 in FIG. 1 contains a plurality of selected locations 42 from which RF signal propagation characteristics have been measured.

In an alternative embodiment, signature regions 44 may be selected based upon local correlations observed in the channel impulse responses as determined by comparing a measurement at one location with a measurement at another, or by comparing a group of measurements with another group of measurements. By performing this analysis in the defining of signature regions, irregularly shaped signature regions may be formed, and those signature regions may more accurately represent radio frequency propagation characteristics from the region, which in turn will make location estimation more accurate.

Once the signature regions are defined, the process selects a first signature region, as depicted at block 212. For the selected signature region, each of the measured RF signal propagation characteristics is processed to produce a spatially averaged radio frequency signature for the signature region, as illustrated at block 214. This spatially averaged radio frequency signature represents the dominant features of the radio frequency signal propagation characteristics of a signal transmitted from the selected signature region and received at a base transceiver, such as base transceiver 40.

Figure 7:
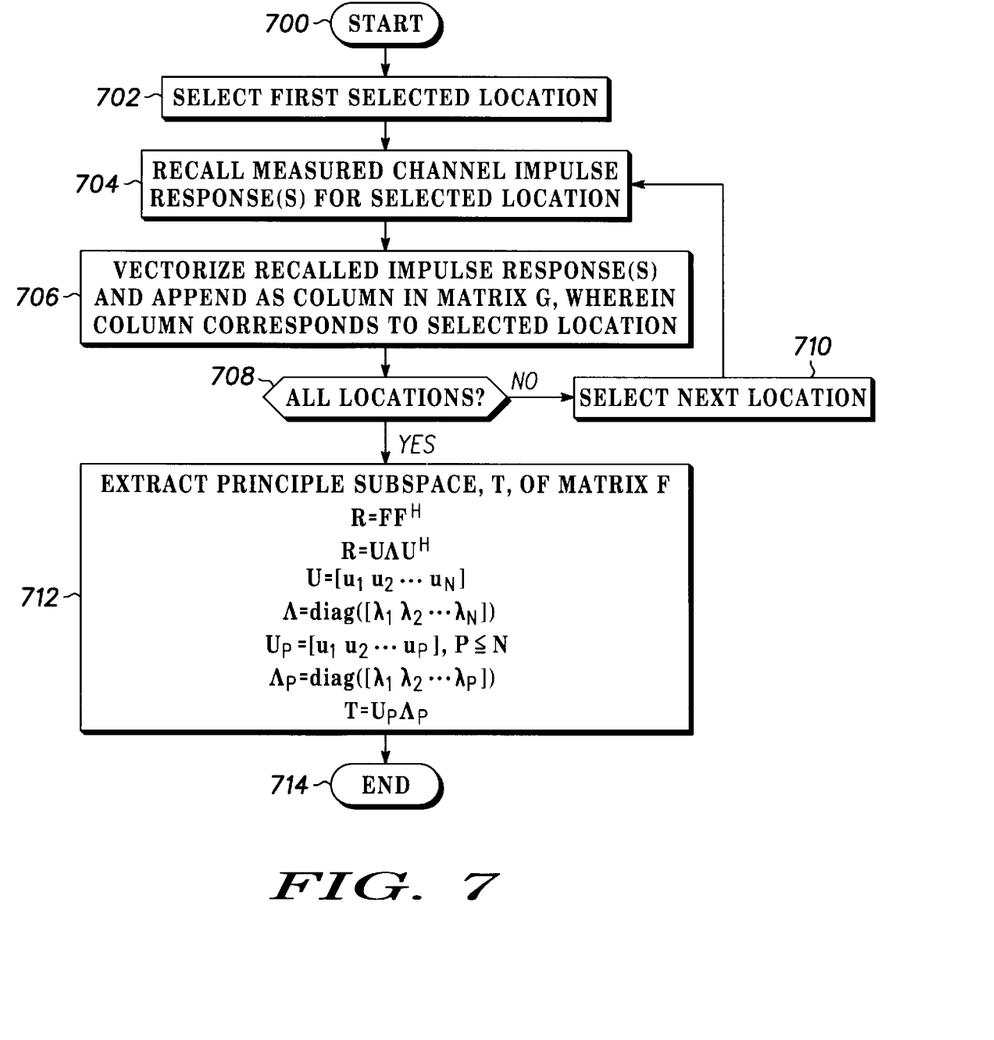
FIG. 7 is a more detailed logic flowchart of the process of producing a spatially averaged radio frequency signature, as shown in FIG. 2.

This process of calculating a spatially averaged radio frequency signature for implicitly measured RF signal propagation characteristics may be more completely understood with reference to FIG. 7.

In FIG. 7, the process of calculating a spatially averaged radio frequency signature for the selected signature region from implicitly measured radio frequency signal propagation characteristics begins at block 700 and thereafter passes to block 702, wherein the process selects a first location within the selected signature region where radio frequency signal propagation characteristics were measured.

Next, the process recalls the measured channel impulse responses for the selected location, as illustrated at block 704. These channel responses are preferably represented as vectors that are associated with the location at which they were collected. If more than one antenna is measured, the impulse responses are recalled as a matrix with each column representing the impulse response from a single antenna, as shown in equation 4.

Next, the process vectorizes the recalled impulse responses and appends the resulting vector as a column in matrix F, wherein the column corresponds to the selected location, as depicted at block 706. Note that the vectorizing process is only necessary if more than one antenna is used at the base transceiver to measure channel impulse responses. For L measurement locations, the matrix F can be represented as follows:

$$f(i)=\text{vec}\{H(i)\}$$
$$F=[f(1) f(2) \ldots f(L)]$$

Next, the process determines whether or not all the measured impulse responses for the measured locations within the selected signature region have been appended in matrix F, as illustrated at block 708. If the responses from all the locations have not been recalled and vectorized, the process selects the next location, as depicted at block 710, and returns to block 704 to recall the next measured channel impulse response.

If the process determines at block 708 that all data has been recalled and appended to form matrix F, the process continues at block 712, wherein principle subspace T is extracted from matrix F. This principle subspace extraction is generally accomplished by partitioning the result of either a singular value decomposition operating directly on matrix F, or by an eigendecomposition operating on a sample covariance matrix estimated from data matrix F. The partitioning separates significant terms from less important terms that may be heavily distorted by noise or other artifacts. This partitioning may be simply accomplished by ranking the computed singular values or eigenvalues in order of their magnitude, and selecting the $P \leq N$ largest values from the group of N values, or components may be selected that exceed a threshold value. More sophisticated methods of determining the principle subspace rank are well known in the literature, e.g. as described in Simon Haykin, ed., *Advances in Spectrum Analysis and Array Processing*, Vol. III, Prentice Hall, 1995, pp. 5–9 and pp. 21–23.

After the step represented at block 712 has been completed, matrix T becomes the spatially averaged RF signature for the selected signature region. Thus, the process of producing a radio frequency signature for the selected signature region from implicitly measured radio frequency signal propagation characteristics ends at block 714.

The process described in relation to FIG. 7 is one that extracts a principle subspace from implicitly measured radio frequency propagation characteristics. For a more complete discussion of principle subspace extraction on implicitly measured radio frequency propagation characteristics, along with other methods of extracting principle subspace, see the dissertation entitled: "Estimation of Parametric Channel Models in Wireless Communication Networks", by Michaela C. Vanderveen, May 1998, Stanford University.

The principal subspace extraction captures the dominant features of the RF signal propagation characteristics from the signature region. This process filters the information received and recorded implicitly in the plurality of impulse response vectors associated with the selected signature region and removes information deemed to be unimportant or less important to location finding.

Figure 10:
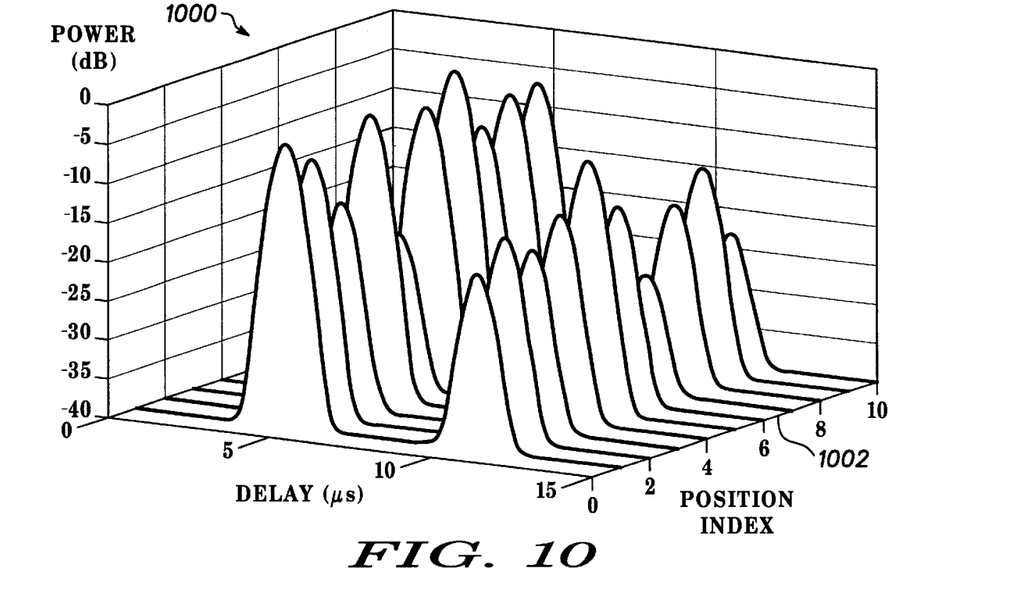
FIG. 10 is a graphical representation of power delay profiles collected from a plurality of locations within a signature region.
Figure 11:
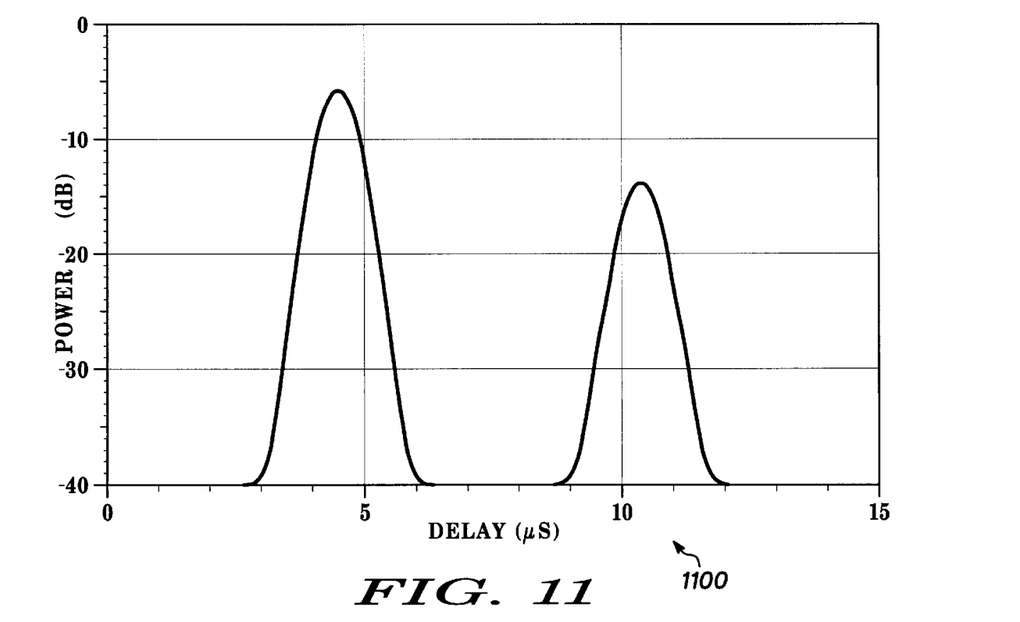
FIG. 11 is a graphical representation of nonlinearly averaging the data of FIG. 10.

An alternative method of extracting the dominant features, and one that is conceptually easier to understand, is to nonlinearly average the measured impulse responses associated with a signature region to deliver a single average power delay profile. With reference to FIG. 10, the measured impulse responses can be converted into power delay profiles by taking the magnitude of the complex valued samples of the impulse response at each delay. Plot 1000 is a graphical representation of a collection of such power delay profiles, with power represented in decibels, delay in microseconds, and the location of each measurement loosely represented as an integer index. The collection of profiles in plot 1000 advance along location axis 1002, wherein the offsets along location axis 1002 represent the plurality of measurements collected that lie within a selected signature region. Averaging along location axis 1002 allows us to extract the mean features, yielding an average power delay profile. With reference to FIG. 11, plot 1100 is a graphical representation of such an average power delay profile extracted from the data of FIG. 10. The average power delay profile can be computed per each antenna measured. The average power delay profile, like the principle subspace, can be used to represent the average or dominant features of the radio frequency signal propagation characteristics.

The dominant features of the radio frequency signal propagation characteristics will tend to be associated with the location of the transmitter and receiver. Because the base transceiver is typically stationary in a traditional wireless communications system, we can use the dominant features to identify the location of the subscriber unit.

After the spatially averaged radio frequency signature is produced for a selected signature region, the process records an association between the spatially averaged radio frequency signature and a location representing the selected signature region, as depicted at block 216. Preferably this recording is done by writing a record in a database that associates each spatially averaged radio frequency signature with its respective signature region, as represented by a location, such as location 46 (See FIG. 1) at the center of signature region 44.

Next, the process determines whether or not another spatially averaged radio frequency signature needs to be calculated for another signature region in the coverage area, as illustrated at block 218. If additional processing for another signature region is needed, the process selects the next signature region, as illustrated at block 220, and then returns to block 214 wherein the next spatially averaged radio frequency signature is calculated.

If the process determines at block 218 that all the signature regions have been processed, the process of database formation ends, as depicted at block 222. The database contains spatially averaged radio frequency signatures for each signature region. The spatially averaged radio frequency signatures contain information that represents the dominant radio frequency propagation characteristics for signals transmitted from the signature region, as determined by mathematically filtering less important information from the measurements from a plurality of selected locations in the signature region. The database is now ready to use to estimate a subscriber unit location, as described in detail below.

Figure 4:
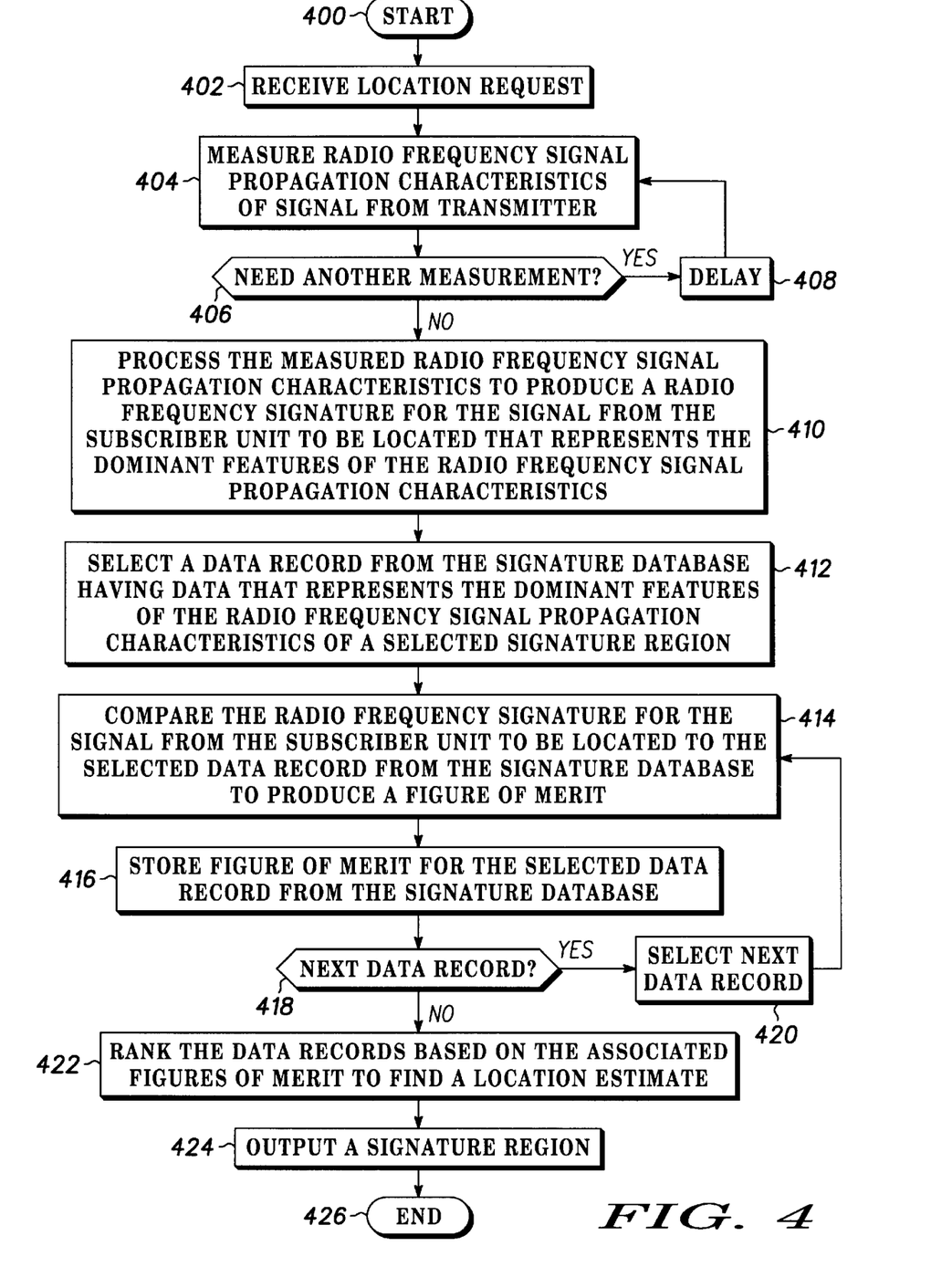
FIG. 4 is a high-level logic flow chart that illustrates the method and operation of measuring a time averaged radio frequency signature for a subscriber unit in a coverage area of a wireless communication system in accordance with the method and system of the present invention.

With reference now to FIG. 4, there is depicted a high-level logic flowchart that illustrates the method and operation of measuring a time averaged radio frequency signature for a transmitter in a coverage area of a wireless communication system, comparing the time averaged radio frequency signature with a spatially averaged radio frequency signature, and in response to the comparison, generating a figure of merit in accordance with the method and system of the present invention. A collection of figures of merit can then be used to estimate the transmitter's location by deciding from which signature region the transmitter is likely to be transmitting.

As illustrated, the process begins at block 400, and thereafter passes to block 402 wherein the process receives a request to estimate the location of a subscriber unit.

After receiving the request, the process measures the radio frequency signal propagation characteristics of a signal from the transmitter of the subscriber unit for which the system is estimating a location, as illustrated at block 404. The measured radio frequency signal propagation characteristics may include the number of multipath components, the average power in each multipath component, the gain and phase of the antenna due to the azimuth and elevation angles of arrival and polarization of the wave front, the Doppler frequency of the wave front, and the relative time delay of the wave front. These characteristics may be measured explicitly by parametric decomposition of the received signal. However, in a preferred embodiment, the radio frequency signal propagation characteristics are measured implicitly by sampling and recording the channel impulse responses of the particular channel between the subscriber to be located and a base transceiver.

The measurement of the radio frequency signal propagation characteristics of the signal from the subscriber unit to be located is very similar to measuring the radio frequency signal propagation characteristics of a signal from a transmitter at a selected location during the formation of the spatially averaged radio frequency signature database, as illustrated at block 204 in FIG. 2.

Once radio frequency signal propagation characteristics have been measured, the process determines whether or not another measurement is needed, as depicted at block 406. Preferably, several measurements of RF signal propagation characteristics will be taken periodically so that a time averaged radio frequency signature for the subscriber unit to be located can be calculated. A single instantaneous measurement of the RF signal propagation characteristics may be adequate in some circumstances, but it is well known that a single sample estimator can be subject to large variations due to the underlying random processes in signal propagation. Estimating the RF signal propagation characteristics from multiple measurements uses statistical principles to mitigate the randomness and extract the average structure or dominant features of the RF signal propagation characteristics.

If another measurement is needed, the process delays, as depicted at block 408, and then passes back to block 404 wherein radio frequency signal propagation characteristics are measured again. The number of measurements taken may be determined by the number of periodic measurements that can be taken over a predetermined fixed interval.

If the process determines at block 406 that enough measurements have been taken, the process proceeds to block 410 wherein the measured radio frequency signal propagation characteristics are processed to produce a time averaged radio frequency signature for the signal from the subscriber unit to be located, wherein the time averaged radio frequency signature represents the dominant features of the radio frequency signal propagation characteristics. This process of calculating the time averaged radio frequency signature may be more completely understood with reference to FIG. 5.

Figure 5:
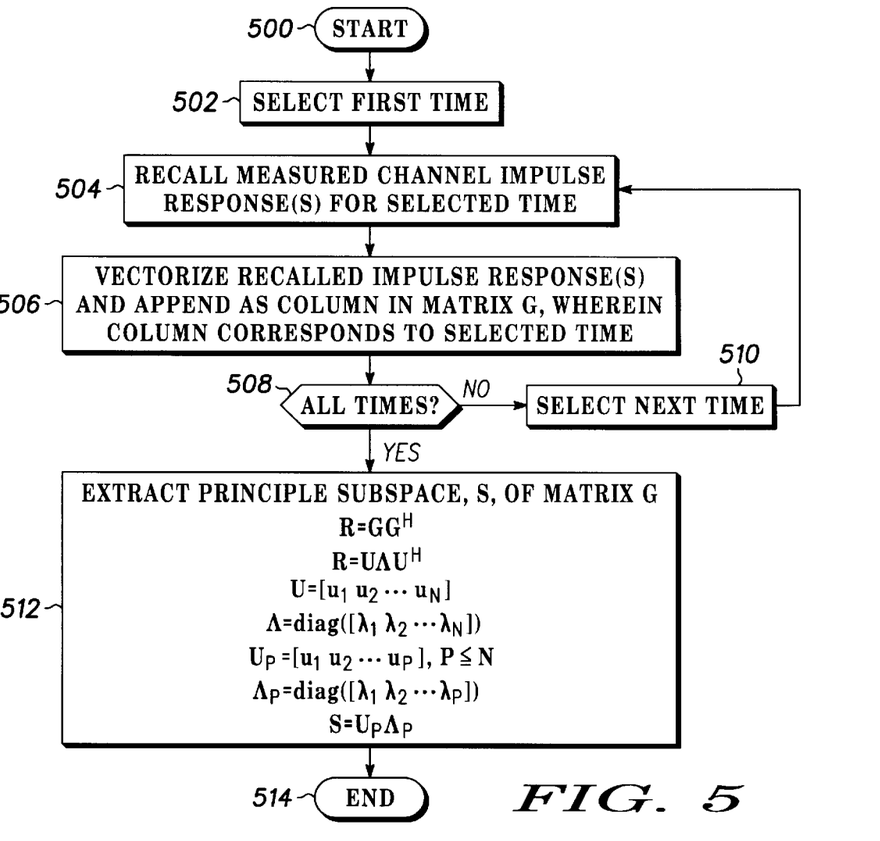
FIG. 5 is a more detailed logic flowchart of the process of producing a spatially averaged radio frequency signature, as shown in FIG. 4.

In FIG. 5, the process of calculating a time averaged radio frequency signature from implicitly measured radio frequency signal propagation characteristics begins at block 500 and thereafter passes to block 502 wherein the process selects a first time at which radio frequency signal propagation characteristics were measured for the signal from the subscriber unit to be located.

Next, the process recalls the measured channel impulse responses for the selected time, as illustrated at block 504. These channel impulse responses are preferably represented as vectors that are associated with the time at which they were collected. If more than one antenna is measured, the responses are recalled as a matrix with each column representing the impulse response from a single antenna, as in equation 4.

Next, the process vectorizes the recalled impulse responses and appends the resulting vector as a column in matrix G, wherein the column corresponds to the selected time, as depicted at block 506. Note that the vectorizing process is only necessary if more than one antenna is used at the base transceiver to measure channel impulse responses. For L measurement times, the matrix G can be represented as follows:

$$g(i) = \text{vec}\{H(i)\}$$
$$G = [g(1) g(2) \ldots g(L)]$$

Next, the process determines whether or not all the measured impulse responses for all the measured times have been appended in matrix G, as illustrated at block 508. If all the times have not been recalled, vectorized, and appended into G, the process selects the next time, as depicted at block 510, and returns to block 504 to recall the next measured channel impulse response.

If the process determines at block 508 that all data has been recalled and appended to form matrix G, the process continues at block 512, wherein principle subspace S is extracted from matrix G. This principle subspace extraction is generally accomplished by partitioning the result of either a singular value decomposition operating directly on matrix G, or by an eigendecomposition operating on a sample covariance matrix estimated from data matrix G. The partitioning separates significant terms from less important terms, which may be heavily distorted by noise or other artifacts. This partitioning may be accomplished by ranking the computed singular values or eigenvalues in order of their magnitude, and selecting the $P \leq N$ largest values from the group of N values. Alternatively, components may be selected that exceed a threshold value. More sophisticated methods of determining the principle subspace rank are well known in the literature, e.g. as described in Simon Haykin, ed., *Advances in Spectrum Analysis and Array Processing*, Vol. III, Prentice Hall, 1995, pp.5–9 and pp. 21–23.

After the step represented at block 512 has been completed, matrix S becomes the time averaged RF signature for the signal from the subscriber unit to be located. Thus, the process of producing a time averaged radio frequency signature from implicitly measured radio frequency signal propagation characteristics ends at block 514.

The process described in relation to FIG. 5 is one that extracts principle subspace from implicitly measured radio frequency propagation characteristics. For more complete discussion of principle subspace extraction on implicitly measured radio frequency propagation characteristics, along with other methods of extracting principle subspace, see the dissertation entitled: "Estimation of Parametric Channel Models in Wireless Communication Networks", by Michaela C. Vanderveen, May 1998, Stanford University.

The principal subspace extraction captures the dominant features of the signal propagated from the signature region. This process filters the information received and recorded implicitly in the plurality of impulse response vectors associated with the selected signature region and removes information deemed to be unimportant or less important to location finding.

Figure 8:
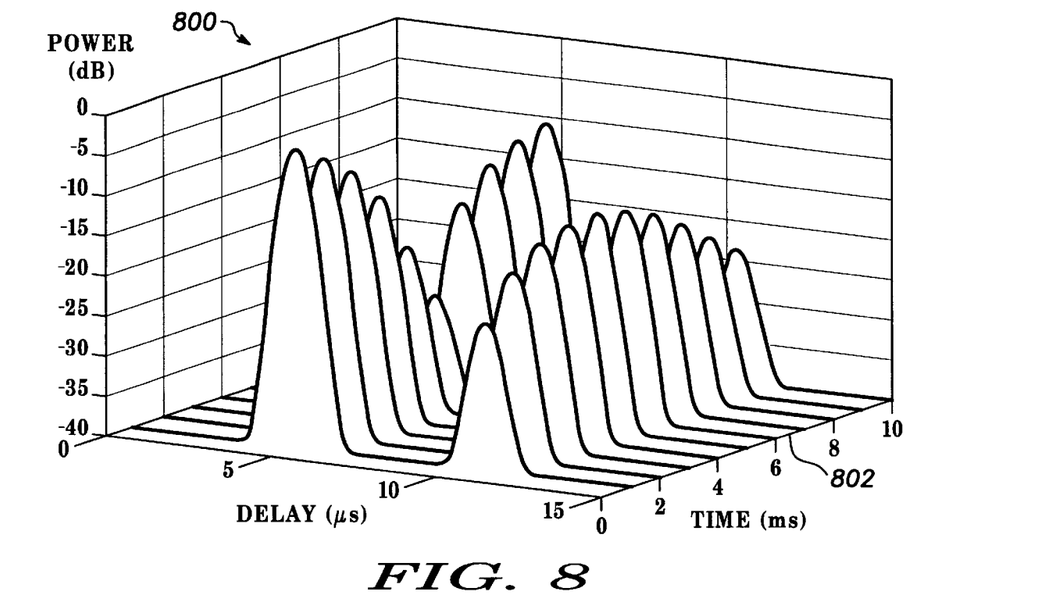
FIG. 8 is a graphical representation of evolving power delay profiles, which are used by the method and system of the present invention.
Figure 9:
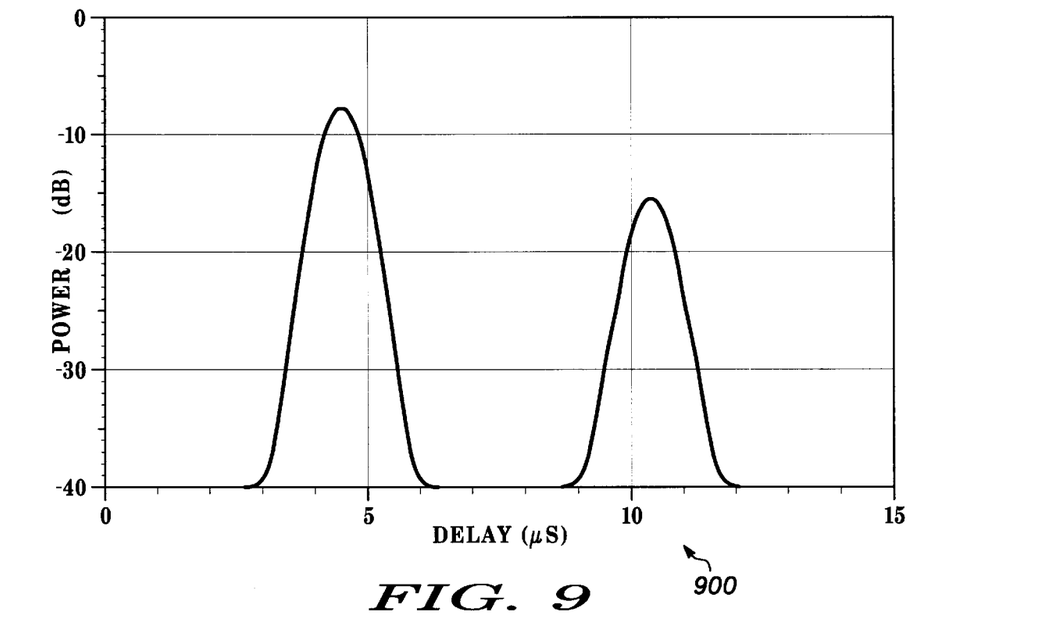
FIG. 9 is a graphical representation of nonlinearly averaging the data of FIG. 8.

An alternative method of extracting the dominant features, and one that is conceptually easier to understand, is to nonlinearly average the measured impulse responses associated with a signature region to deliver a single average power delay profile. With reference to FIG. 8, the measured impulse responses can be converted into power delay profiles by taking the magnitude of the complex valued samples of the impulse response at each delay. Plot 800 is a graphical representation of a collection of such power delay profiles, with power represented in decibels, delay in microseconds, and the time of measurement of each power delay profile measured in milliseconds. The collection of profiles in plot 800 advances along time axis 802, wherein location axis 802 represents the plurality of measurements collected within a span of time. Averaging along time axis 802 allows us to extract the mean features, yielding an average power delay profile. With reference to FIG. 9, plot 900 is a graphical representation of such an average power delay profile extracted from the data of FIG. 8. The average power delay profile can be computed per each antenna measured. The average power delay profile, like the principle subspace, can be used to represent the average or dominant features of the radio frequency signal propagation characteristics.

The dominant features of the radio frequency signal propagation characteristics will tend to be associated with the location of the transmitter and receiver. Because the base transceiver is typically stationary in a traditional wireless communications system, we can use the dominant features to identify the location of the subscriber unit.

With reference again to FIG. 4, after the time average radio frequency signature has been calculated at block 410, the process selects a data record from the signature database having data that represents the dominant features of the radio frequency signal propagation characteristics of a selected signature region, as illustrated at block 412.

The process then compares the time averaged radio frequency signature for the signal from the subscriber unit to be located to the selected data record from the signature database, which contains a spatially averaged radio frequency signature, to produce a figure of merit, as depicted at block 414. In a preferred embodiment, where the radio frequency signatures are derived from implicit measurements, the process of computing a figure of merit may be accomplished by calculating the distance between the principle subspaces represented by the time averaged radio frequency signature from the subscriber unit to be located and the spatially averaged radio frequency signature from the selected data record in the database. The distance computation may be performed by computing the norm of the projection of one signature onto the other. This comparison may be a weighted comparison where more important information is given more consideration.

Alternatively, for explicitly measured radio frequency signal propagation characteristics, the signatures may be hyperdimensional vectors representing the parameters of the explicit propagation model, as in equation 2, and the figure of merit representing their comparison can be the distance between spatially and temporally averaged versions of these hyperdimensional vectors, similar to the methods outlined above for implicit measurements. Note that here, as elsewhere, averaging can include traditional linear averaging, nonlinear averaging, or subspace based averaging via extraction of a principle subspace.

Next, the process stores the figure of merit associated with the selected data record from the spatially averaged radio frequency signature database, as illustrated at block 416. Thereafter, the process determines whether or not there is another data record to compare, as depicted at block 418. If there is another data record to compare, the process selects the next data record, as illustrated at block 420, and then returns to block 414 to compare the two radio frequency signatures.

If the process determines that all data records have been compared, the process continues at block 422, wherein the process ranks the data records based on the associated figures of merit in order to find a location estimate. Once the location estimate has been found, the process outputs the coordinates of a signature region that corresponds to the location estimate, as depicted at block 424. This output may be the coordinates of a location associated with the signature region, such as the coordinates of location 46. The process then terminates as indicated at block 426.

Figure 6:
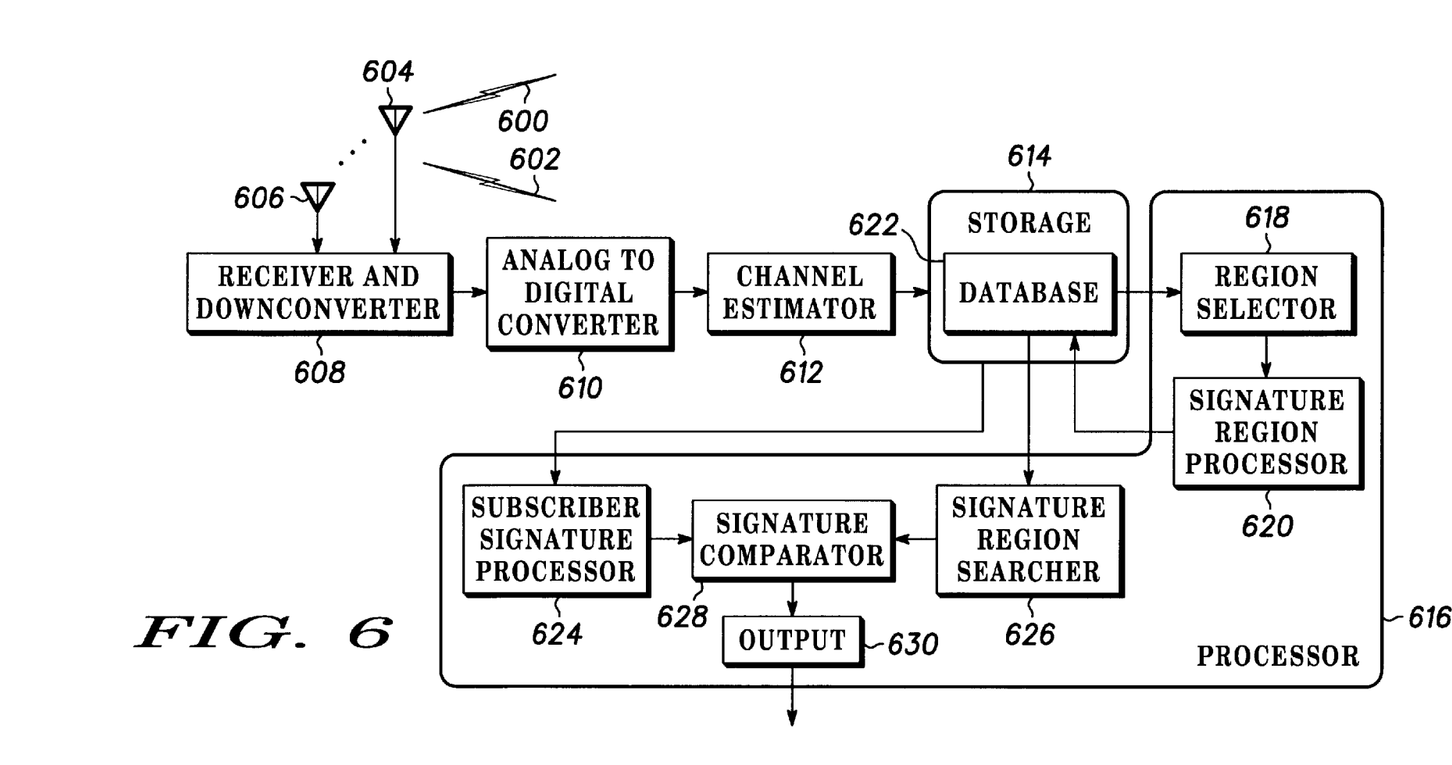
FIG. 6 depicts a system used to create radio frequency signatures for signature regions in a coverage area of a wireless communication system, and also for measuring a radio frequency signature for a subscriber unit to be located in a coverage area during a location event, in accordance with the method and system of the present invention.

With reference now to FIG. 6, there is depicted a system used to create a radio frequency signature for a signature region in a coverage area of a wireless communication system, and also for measuring a time averaged radio frequency signature for a subscriber unit to be located in the coverage area, in accordance with a method and system of the present invention. As illustrated, a plurality of wave fronts 600 and 602 are received by antennas 604–606. Wavefront 600–602 represent a signal from a single source that has been subjected to multipath distortion. In other words, both wave front 600 and 602 came from the same transmitter through different propagation paths.

In a typical embodiment, antennas 606–604 may be implemented with two diversity receive antennas in each of three sectors on the top of a typical cellular tower. Antennas 606–604 are coupled to receiver and down converter 608, which translates the spectrum from radio frequency to complex valued baseband.

The output of receiver and down converter 608 is coupled to the input of analog-to-digital converter 610, which converts the complex valued baseband signal to a stream of digital values. The stream of digital values output by analog-to-digital converter 610 is coupled to the input of channel estimator 612. Channel estimator 612 estimates the radio frequency signal propagation characteristics of wave fronts 600–602. These radio frequency signal propagation characteristics may include the number of multipath components, the average power in each multipath component, the gain and phase of the antenna due to the azimuth and elevation angles of arrival and polarization of the wave front, the Doppler frequency of the wave front, and the relative time delay of the wave front. As mentioned previously, these characteristics may measured explicitly by parametric decomposition of the received signal, or implicitly by estimating, sampling and recording the channel impulse responses.

The output of channel estimator 612, whether implicit representations of radio frequency propagation characteristics or explicit measurements of these characteristics, are stored in storage 614. This storage may be implemented with any commonly known data storage device, such as a hard disk, tape, random access memory, CD ROM, and the like.

Processor 616 is coupled to storage 614 for recalling and processing data, and storing the results of such processing. Processor 616 may be implemented with a general purpose microprocessor, a custom application specific integrated circuit, or a digital signal processor. Within processor 616 are other functional blocks which may be implemented with various combinations of hardware and software. Note also that channel estimator 612 may also be implemented in processor 616.

With regard to a system that builds the spatially averaged radio frequency signature database, processor 616 contains region selector 618, which recalls data stored in storage 614, wherein the data represents measured radio frequency signal propagation characteristics of a particular signature region. Region selector 618 then passes this data to signature region processor 620, which computes a spatially averaged radio frequency signature for a selected signature region and stores such signature in database 622, where it is associated with a particular signature region. The spatially averaged radio frequency signatures are calculated as discussed with reference to FIGS. 2 and 7.

When processor 616 has received a request to estimate the location of a subscriber unit, subscriber signature processor 624 recalls data measurements made by channel estimator 612 from storage 614. These measurements represent radio frequency signature propagation characteristics of a signal from the subscriber unit to be located measured over a plurality of times. Subscriber signature processor 624 computes a time averaged radio frequency signature, as described with reference to FIGS. 4 and 5.

The process of comparing a time averaged radio frequency signature with a spatially averaged radio frequency signature begins with signature region searcher 626 recalling a spatially averaged radio frequency signature from database 622 for a selected signature region. The output of signature region searcher 626 is coupled to one of the inputs of signature comparator 628, and another input of signature comparator 628 is coupled to the output of subscriber signature processor 624. Signature comparator 628 compares the time averaged radio frequency signature of the signal from the subscriber unit to be located and the spatially averaged radio frequency signature of a selected signature region and generates a figure of merit as a result of the comparison. Signature comparator 628 may be coupled to storage 614 in order to temporarily store figures of merit that relate to each signature region recalled by signature region search 626. Signature comparator 628 may also store the figure of merit and the corresponding signature region in a peak holding manner such that if a higher figure of merit is produced, that figure of merit, along with its signature region coordinates, replace the previous value. Signature comparator 628 is coupled to output function 630, which formats the subscriber unit's estimated location represented by the signature region with the best figure of merit. This output may be in the form of position coordinates of the signature region, such as location 46, or by displaying a map showing the location of the subscriber unit.

It should be noted that the above embodiments have tended to speak to an uplink mode of operation, in which a mobile subscriber unit is the transmitter, and the base transceiver station is the receiver. Alternate combinations of receiver and transmitter are possible in practice, including operation on the downlink. Downlink operation may be achieved by measuring the radio frequency signal propagation characteristics in the subscriber unit, and either computing an associated radio frequency signature in the subscriber unit, or sending the characteristics to the base transceiver for processing to a radio frequency signature. Similar to the uplink methods, this can be done for multiple antennas at the base transceiver.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for comparing measured radio frequency signal propagation characteristics in a wireless communication system, the method comprising the steps of:
    at a receiver, periodically measuring a plurality of radio frequency signal propagation characteristics associated with a signal transmitted from a transmitter in a coverage area of the wireless communication system;
    processing the plurality of periodically measured radio frequency signal propagation characteristics to produce a time averaged radio frequency signature, wherein the processing extracts the dominant features of the radio frequency signal propagation characteristics;
    comparing the time averaged radio frequency signature with a spatially averaged radio frequency signature; and
    in response to the comparison, generating a figure of merit.

2. The method for comparing measured radio frequency signal propagation characteristics according to claim 1 wherein the step of periodically measuring a plurality of radio frequency signal propagation characteristics associated with a signal transmitted from a transmitter further includes periodically measuring channel impulse responses of radio frequency signal associated with a signal transmitted from a transmitter in a coverage area of the wireless communication system.

3. The method for comparing measured radio frequency signal propagation characteristics according to claim 1 wherein the step of periodically measuring a plurality of radio frequency signal propagation characteristics associated with a signal transmitted from a transmitter further includes periodically measuring power delay profiles of radio frequency signal associated with a signal transmitted from a transmitter in a coverage area of the wireless communication system.

4. The method for comparing measured radio frequency signal propagation characteristics according to claim 1 wherein the step of processing the plurality of periodically measured radio frequency signal propagation characteristics to produce a time averaged radio frequency signature further includes decomposing a structured matrix containing vector representations of the plurality of periodically measured radio frequency signal propagation characteristics to extract a subspace that represents the dominant features of the radio frequency signal propagation characteristics of a signal transmitted from a transmitter in a coverage area of the wireless communication system.

5. The method for comparing measured radio frequency signal propagation characteristics according to claim 1 wherein the step of processing the plurality of periodically measured radio frequency signal propagation characteristics to produce a time averaged radio frequency signature further includes linearly averaging the plurality of periodically measured radio frequency signal propagation characteristics to extract a mean characteristic that represents the dominant features of the radio frequency signal propagation characteristics of a signal transmitted from a transmitter in a coverage area of the wireless communication system.

6. The method for comparing measured radio frequency signal propagation characteristics according to claim 1 wherein the step of processing the plurality of periodically measured radio frequency signal propagation characteristics to produce a time averaged radio frequency signature further includes nonlinearly averaging the plurality of periodically measured radio frequency signal propagation characteristics to extract an average characteristic that represents the dominant features of the radio frequency signal propagation characteristics of a signal transmitted from a transmitter in a coverage area of the wireless communication system.

7. The method for comparing measured radio frequency signal propagation characteristics according to claim 1 wherein the step of comparing the time averaged radio frequency signature with a spatially averaged radio frequency signature further includes computing a norm of a projection of the time averaged radio frequency signature onto a spatially averaged radio frequency signature.

8. The method for comparing measured radio frequency signal propagation characteristics according to claim 1 wherein the spatially averaged radio frequency signature is formed by decomposing a structured matrix containing vector representations of signal propagation characteristics of a plurality of signals previously transmitted from different locations within a selected signature region in a coverage area in the wireless communication system to extract a subspace that represents the dominant features of the radio frequency signal propagation characteristics of a signal transmitted within the selected signature region.

9. A system for comparing measured radio frequency signal propagation characteristics in a wireless communication system comprising:
    means, at a receiver, for periodically measuring a plurality of radio frequency signal propagation characteristics associated with a signal transmitted from a transmitter in a coverage area of the wireless communication system;
    means for processing the plurality of periodically measured radio frequency signal propagation characteristics to produce a time averaged radio frequency signature, wherein the processing extracts the dominant features of the radio frequency signal propagation characteristics;
    means for comparing the time averaged radio frequency signature with a spatially averaged radio frequency signature; and means for generating a figure of merit in response to the comparison.

10. The system for comparing measured radio frequency signal propagation characteristics according to claim 9 wherein the means for periodically measuring a plurality of radio frequency signal propagation characteristics associated with a signal transmitted from a transmitter further includes means for periodically measuring channel impulse responses of radio frequency signal associated with a signal transmitted from a transmitter in a coverage area of the wireless communication system.

11. The system for comparing measured radio frequency signal propagation characteristics according to claim 9 wherein the means for periodically measuring a plurality of radio frequency signal propagation characteristics associated with a signal transmitted from a transmitter further includes means for periodically measuring power delay profiles of radio frequency signal associated with a signal transmitted from a transmitter in a coverage area of the wireless communication system.

12. The system for comparing measured radio frequency signal propagation characteristics according to claim 9 wherein the means for processing the plurality of periodically measured radio frequency signal propagation characteristics to produce a time averaged radio frequency signature further includes means for decomposing a structured matrix containing vector representations of the plurality of periodically measured radio frequency signal propagation characteristics to extract a subspace that represents the dominant features of the radio frequency signal propagation characteristics of a signal transmitted from a transmitter in a coverage area of the wireless communication system.

13. The system for comparing measured radio frequency signal propagation characteristics according to claim 9 wherein the means for processing the plurality of periodically measured radio frequency signal propagation characteristics to produce a time averaged radio frequency signature further includes means for linearly averaging the plurality of periodically measured radio frequency signal propagation characteristics to extract a mean characteristic that represents the dominant features of the radio frequency signal propagation characteristics of a signal transmitted from a transmitter in a coverage area of the wireless communication system.

14. The system for comparing measured radio frequency signal propagation characteristics according to claim 9 wherein the means for processing the plurality of periodically measured radio frequency signal propagation characteristics to produce a time averaged radio frequency signature further includes means for nonlinearly averaging the plurality of periodically measured radio frequency signal propagation characteristics to extract an average characteristic that represents the dominant features of the radio frequency signal propagation characteristics of a signal transmitted from a transmitter in a coverage area of the wireless communication system.

15. The system for comparing measured radio frequency signal propagation characteristics according to claim 9 wherein the means for comparing the time averaged radio frequency signature with a spatially averaged radio frequency signature further includes means for computing a norm of a projection of the time averaged radio frequency signature onto a spatially averaged radio frequency signature.

16. The system for comparing measured radio frequency signal propagation characteristics according to claim 9 wherein the spatially averaged radio frequency signature is formed by decomposing a structured matrix containing vector representations of signal propagation characteristics of a plurality of signals previously transmitted from different locations within a selected signature region in a coverage area in the wireless communication system to extract a subspace that represents the dominant features of the radio frequency signal propagation characteristics of a signal transmitted within the selected signature region.

\* \* \* \* \*